(12) United States Patent
Sobota et al.

(10) Patent No.: US 12,691,777 B2
(45) Date of Patent: Jul. 28, 2026

(54) WIRELESS CHARGING PHOTOVOLTAIC SURFACES

(71) Applicant: Stephen Melvin, Vancouver (CA)

(72) Inventors: Cristian Sobota, Ilhéus (BR); Adolfo Nemirovsky, San Jose, CA (US); Stephen Melvin, Vancouver (CA)

( * ) Notice: Subject to any disclaimer, the term of this patent is extended or adjusted under 35 U.S.C. 154(b) by 0 days.

(21) Appl. No.: 19/115,492

(22) PCT Filed: Sep. 26, 2023

(86) PCT No.: PCT/US2023/033753
§ 371 (c)(1),
(2) Date: Mar. 26, 2025

(87) PCT Pub. No.: WO2024/072827
PCT Pub. Date: Apr. 4, 2024

(65) Prior Publication Data
US 2026/0097672 A1 Apr. 9, 2026

Related U.S. Application Data

(60) Provisional application No. 63/377,246, filed on Sep. 27, 2022.

(51) Int. Cl.
B60L 53/51 (2019.01)
B60L 53/12 (2019.01)
(Continued)

(52) U.S. Cl.
CPC ............... B60L 53/51 (2019.02); B60L 53/12 (2019.02); B60L 53/62 (2019.02); G08C 23/04 (2013.01);
(Continued)

(58) Field of Classification Search
CPC .......... B60L 53/51; B60L 53/12; B60L 53/62; G08C 23/04; H02J 7/35; H02J 50/12; H02J 50/402
See application file for complete search history.

(56) References Cited

U.S. PATENT DOCUMENTS

| | | |
|---|---|---|
| 9,035,499 B2 | 5/2015 | Kesler et al. |
| 11,186,187 B1 | 11/2021 | Sobota Rodriguez et al. |

(Continued)

OTHER PUBLICATIONS

International Search Report for PCT/US2023/033753.

*Primary Examiner* — Jeffrey M Shin
(74) *Attorney, Agent, or Firm* — Stephen W. Melvin

(57) ABSTRACT

An apparatus able to acquire, accumulate and transmit energy. The apparatus comprises an active surface that collects solar energy from an array of photovoltaic cells and transmits that energy to a battery-operated device located near the surface by means of a matrix of wireless energy emitting circuits. The battery-operated device, which can be a robot, a vehicle or an appliance, has a wireless receiver surface that allows it to be recharged when placed over or close to the active surface. The wireless receiver surface on the application device emits light pulses that are detected by the active surface. The light pulses serve to locate the device and to control the wireless power output emission. The active surface detects the modulated light pulses with the same photovoltaic cells that collect solar energy and also act as an array of high frequency optical sensors, thereby activating the aligned wireless emitting circuits.

20 Claims, 9 Drawing Sheets

(51) Int. Cl.

| | | |
|---|---|---|
| *B60L 53/62* | (2019.01) | |
| *G08C 23/04* | (2006.01) | |
| *H02J 7/35* | (2006.01) | |
| *H02J 50/12* | (2016.01) | |
| *H02J 50/40* | (2016.01) | |

(52) U.S. Cl.

CPC ................ *H02J 7/35* (2013.01); *H02J 50/12* (2016.02); *H02J 50/402* (2020.01)

(56) References Cited

U.S. PATENT DOCUMENTS

| | | | | |
|---|---|---|---|---|
| 11,394,344 B2 * | 7/2022 | Perkins | .................... | H02J 50/40 |
| 2007/0114967 A1 * | 5/2007 | Peng | ........................ | H02J 50/30 |
| | | | | 320/101 |
| 2020/0389057 A1 | 12/2020 | Hajimiri et al. | | |
| 2023/0226937 A1 | 7/2023 | Hanson et al. | | |

* cited by examiner

Solar energy input

Wireless energy output

101

A

B

WIRELESS CHARGING PHOTOVOLTAIC SURFACES

FIELD OF THE INVENTION

The present invention relates to the field of wireless charging and renewable energy technology, and more specifically to an apparatus able to collect solar energy and transmit energy to recharge the batteries of appliances, robots and vehicles when they are in proximity to its surface. This invention provides a convenient and eco-friendly way of recharging battery-operated devices without the need of cables or plugs.

BACKGROUND

The use of electric vehicles and robots operated by batteries is expanding at a fast pace. In part, this evolution is caused by the advances produced in energy accumulation devices such as lithium-ion batteries. However, this fast-moving scenario creates challenges in other related fields that have not advanced so rapidly. One of these challenges is the recharging infrastructure needed for such an explosion of battery-operated devices.

Larger markets such as electric car mobility have seen considerable advances in the recharging infrastructure and related technologies. Other areas, nonetheless, still lack the adequate infrastructure and technology advances needed to transform them into ubiquitous and fully functional ecosystems. One of these areas is, for example, the autonomous and tele-operated robot group of applications, where the human manual operation and interaction is not always possible to recharge batteries, connect a charger, find a line power plug and other related tasks. Existing recharge solutions and their technologies do not provide the needed characteristics in terms of power scalability, infrastructure development, cost efficiency, safety and security for their proper development and expansion. For autonomous robots, for example, some present solutions involve the use of very expensive electromechanical equipment. Others are very specific for their devices and a majority of them are not universal, safe, water proof and scalable.

Aerospace robots and exploration vehicles typically cannot transport their own solar panels, and even as their size, weight, and instrument carrying capacity expands, having a separate solar energy power plant and charging equipment is quite inefficient in terms of weight and complexity.

Unfortunately, there are limited solutions that allow the extension of the recharging infrastructure while also extending the energy collecting capability in a way that allows the scalability of the whole system in terms of recharging elements quantity and individual power demand.

DETAILED DESCRIPTION

The present invention is an apparatus for acquiring, accumulating and transmitting energy. The apparatus comprises a planar active surface that collects solar energy from an array of photovoltaic cells and transmits wireless energy to a battery-operated device located near the surface by means of a matrix of wireless energy emitting circuits embedded in the surface.

A battery-operated device, which can be a robot, a vehicle or an appliance, has a wireless receiver surface that allows it to be recharged when placed over or close to the active surface. The wireless receiver surface emits light pulses that are detected by the active surface. The light pulses have the double function of locating the object and controlling the wireless output power emission. The active surface detects the modulated light pulses with the same photovoltaic cells that collect solar energy and also act as an array of high frequency optical sensors, thereby activating the aligned wireless emitting circuits.

The active surface can be described conceptually as a three-layer matrix of active elements. The first layer captures the solar energy by means of a matrix of photovoltaic elements. The second layer is a matrix of wireless coil elements in which the coils are located in front of, behind or embedded in between the photovoltaic cells. These coils enable the distributed wireless charging mechanism. The third layer is the optical positioning and controlling layer, and it consists of the same array of solar photovoltaic cells and electronic control elements. In this third layer, the photovoltaic cells are the same as in the first layer but they also act as high frequency light sensors. Together with the electronic acquisition and filtering modules, each solar photovoltaic cell can detect light pulses emitted by a battery-operated device near the surface and activate its corresponding wireless transmitting coil.

The described apparatus can be scaled up to obtain larger surfaces with higher solar energy collecting capacities and higher wireless power transmission rates for different applications.

Figure 1:
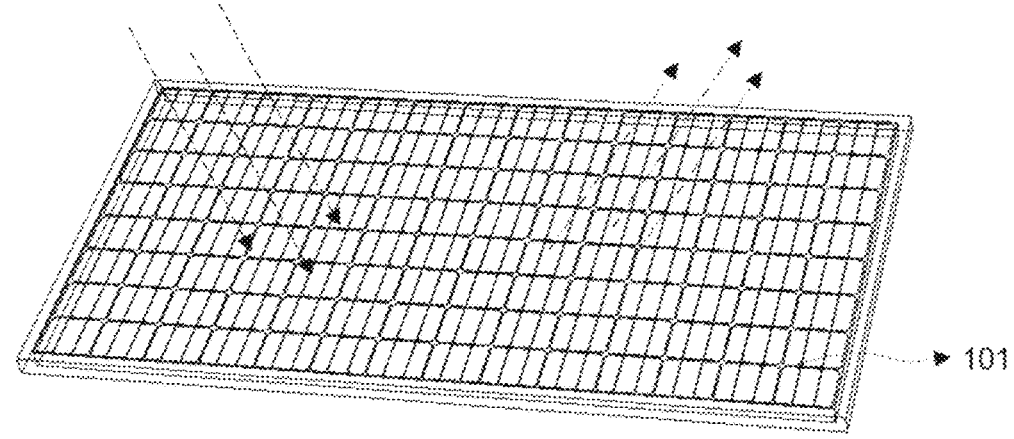
FIG. 1 illustrates an embodiment of a charging surface device showing its input and output energy flow directions.

FIG. 1 illustrates a planar device, the active surface, with two main simultaneous functionalities, solar energy collection and wireless energy transmission. The active surface not only acts receiving solar energy and transforming it to electrical form, it also transmits energy back to a wireless receiver above it or in its proximity, using inductive energy (101). Examples of applications are robots, drones, space vehicles, light electric vehicles or any type of appliance that can recharge their internal batteries by carrying a wireless receiver and positioning itself above or in proximity of an active surface.

Figure 2:
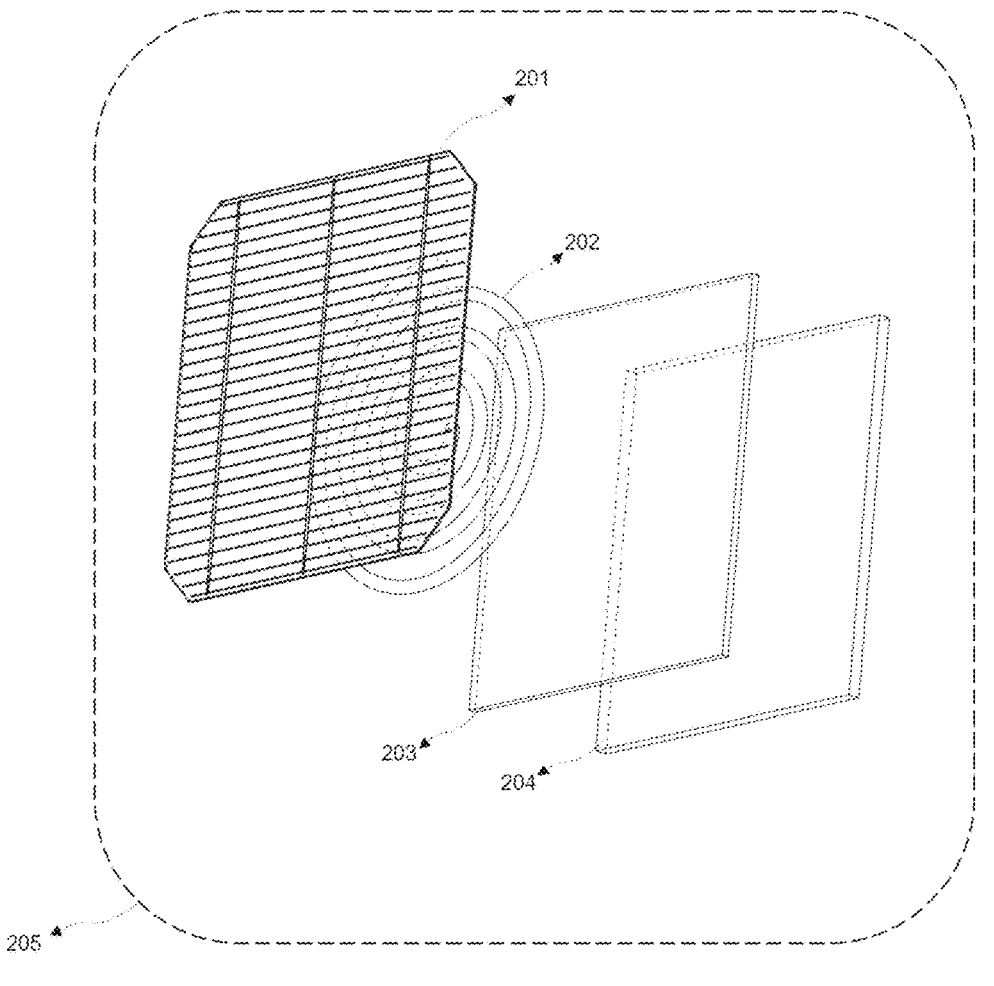
FIG. 2 illustrates an exploded view of the elements conforming the basic surface components or active cells.
Figure 3:
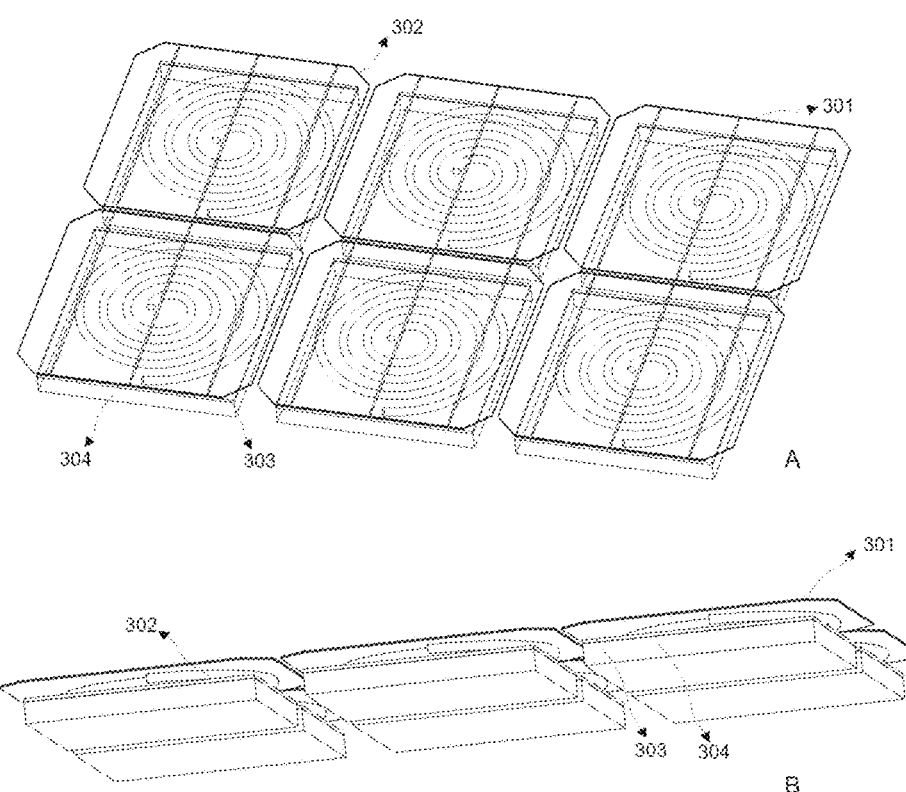
FIG. 3 illustrates the conformation of active surfaces as a matrix of several active cells.

The basic structure of the active surface in a preferred embodiment is comprised of a matrix of electronic, magnetic and optical devices composing active cells. Each active cell, as shown in FIG. 2, consists of a solar photovoltaic cell (201), an induction coil (202), a soft ferrite material acting as magnetic amplification material (203), and a control electronics module (204). The combination of the described parts above forms an active cell once assembled (205) and the combination of these active cells form active surfaces. FIG. 3A and FIG. 3B show matrices of active cells with their respective solar cells (301) and coil arrangements (302), creating a surface device with the capacity to receive solar energy and emit wireless energy as represented in FIG. 1 (101).

Figure 14:
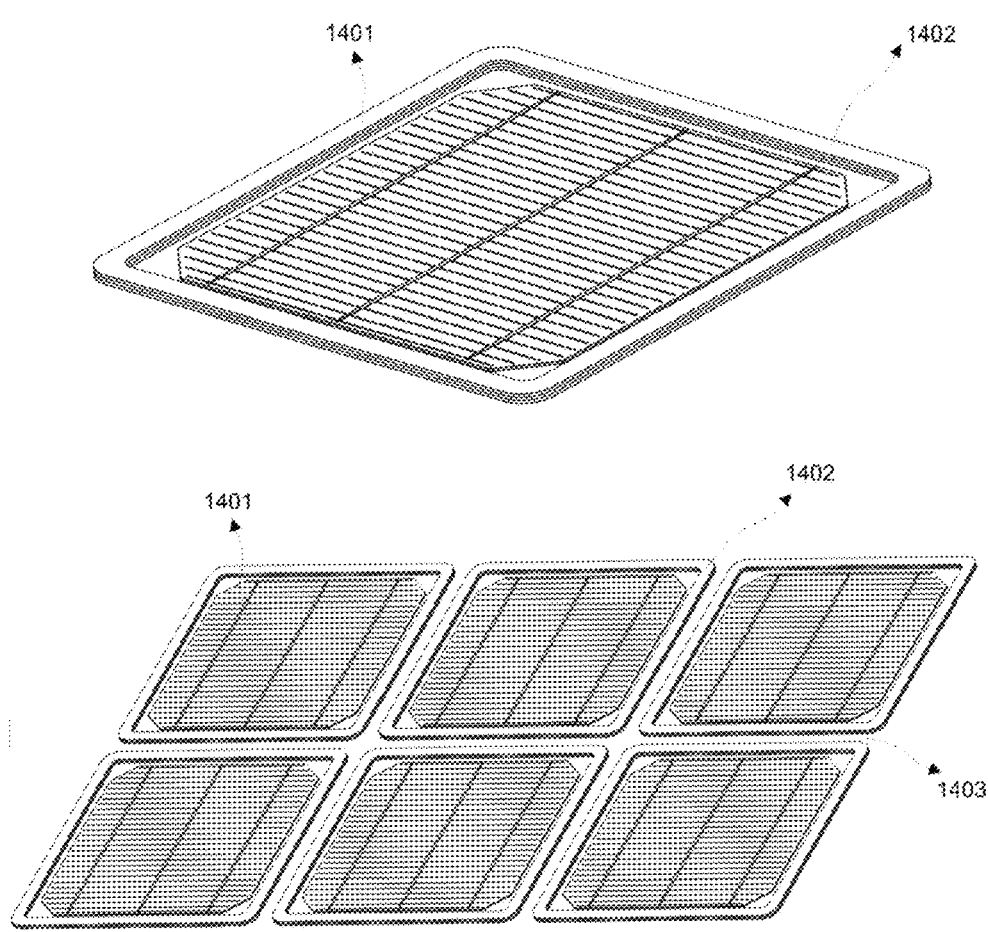
FIG. 14 illustrates the conformation of active cells and active surfaces with the alternative coil configuration located between solar cells instead of behind them.

The coil arrangements can be located in front of or behind the solar cells (202) or between them, FIG. 14 (1402). If the manufacturing process of the solar cells involves back metallic surfaces or planes, the coils located behind the cells (1401) would cause an efficiency loss in the inductive coupling due to eddy currents. In those cases, the coil arrangements can be located on the same plane of the solar cells and around them (1402), creating a similar array of solar cells and coils placed in the spaces between them (1403).

In a preferred embodiment, the active surface also has the capacity to store energy in electrochemical, lithium ion or other type of batteries, capacitors or other energy storage systems and retransmit it to robots, light electrical vehicles, appliances or other types or electromechanical or electronical devices. The energy storage batteries or capacitors included in the active surfaces can be embedded in each of the active cell electronic modules (204) or can be arranged externally in packs with higher voltage and power configurations. By externally we mean located outside each electronic module, but the battery configuration can be placed inside the active surface box. In alternative embodiments the energy storage system could be mechanical, electrical, electromagnetic, electrochemical, thermal, or chemical, or some combination of the above types.

The trigger method of the wireless emission system is optical, specifically, light pulses from light-emitting diode (LED), laser or other semiconductor or light source capable of emitting a controlled train of pulses in a predefined pattern. The light pulses are emitted by a device in the proximity of the active surface, that is, the wireless receiver device located in the battery-operated apparatus.

The wireless receiver unit is the group of elements that emits light pulses in a controlled manner and receives energy in response from the active surface in the form of oscillating magnetic energy.

Figure 15:
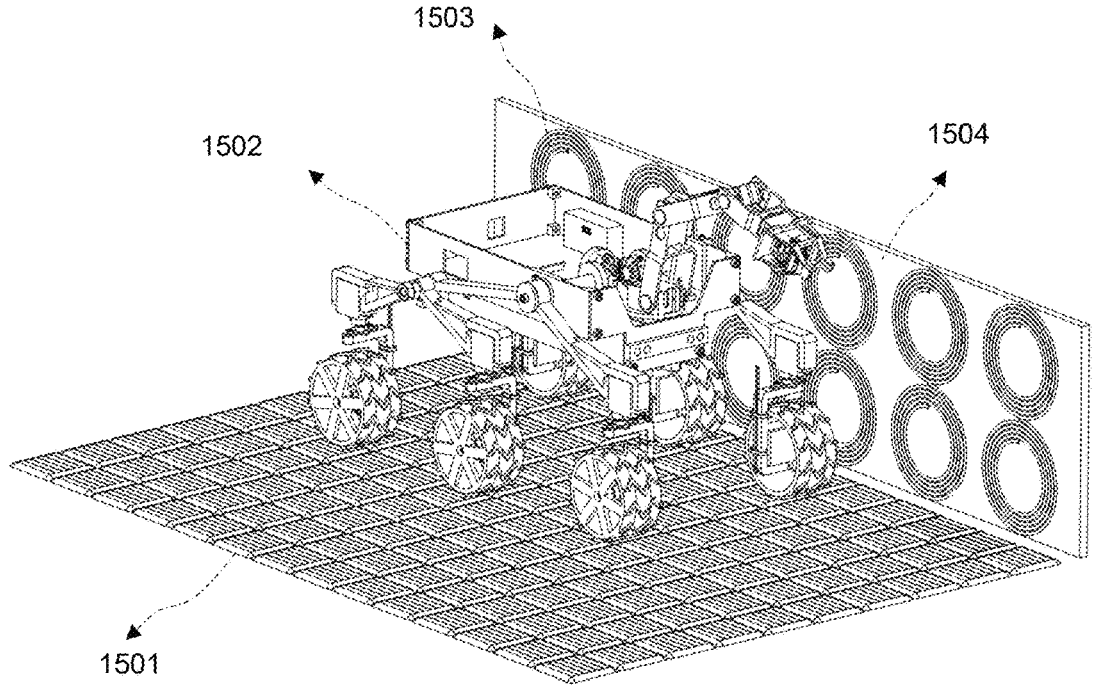
FIG.15 illustrates an embodiment in which wireless charging coils are located on a different and non-coplanar surface from the one formed by the solar cell array.

In other embodiments, wireless charging coils can be located on a surface different from the one formed by the solar cell array in FIG. 15 (1501, 1054). The solar cell array surface (1501) functions similarly to the previously described functionality, capturing solar energy and storing it internally with the embedded battery cells. The charging device's location is determined by optical pulses emitted by the device. However, the wireless energy transmission coils (1503) are situated on a non-coplanar surface (1504). The electronic modules that control the power coils establish digital communication with the solar cell surface's electronic detection and control modules. Consequently, only the aligned power coils (1503) will be activated based on the charging device's location.

Other physical orientations between the wireless charging coils and the solar cell array are possible. Any known physical relationship between the location where optical pulses are emitted by the charging device and the location of its receiving coils can be used in connection with a corresponding known physical relationship between a solar cell receiving optical pulses and the energy transmission coils that are activated in response.

This method allows for rapid positioning of objects on its surface, even if the surface does not have embedded charging capabilities. Rapid positioning is one of the main challenges to address for large wireless charging surfaces. Additionally, the system's fast response enables recharging of moving objects circulating on top of its surface, such as robots or other electric vehicles.

Figure 4:
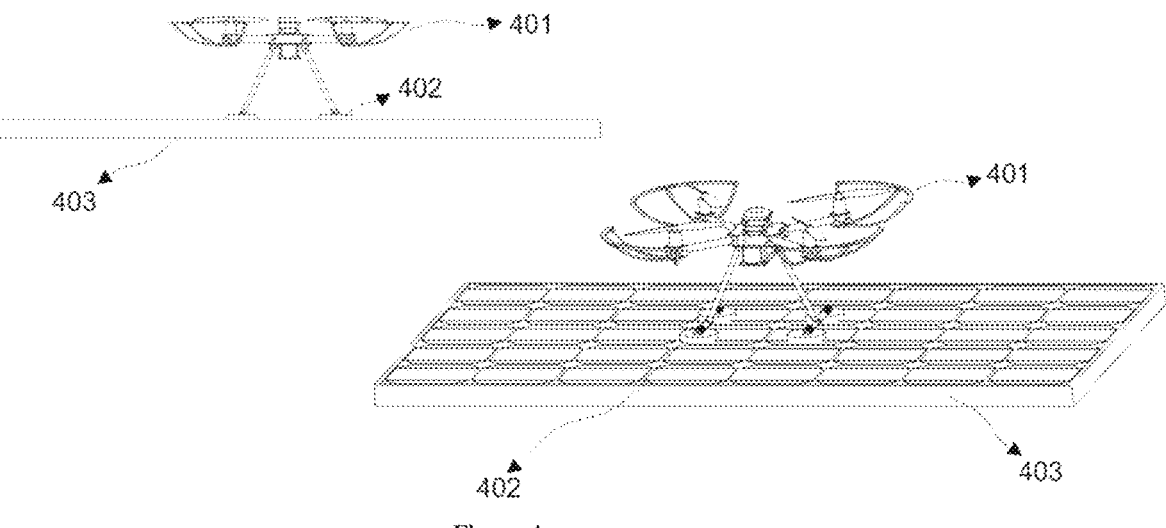
FIG. 4 illustrates an embodiment of the device as a drone charging system.
Figure 5:
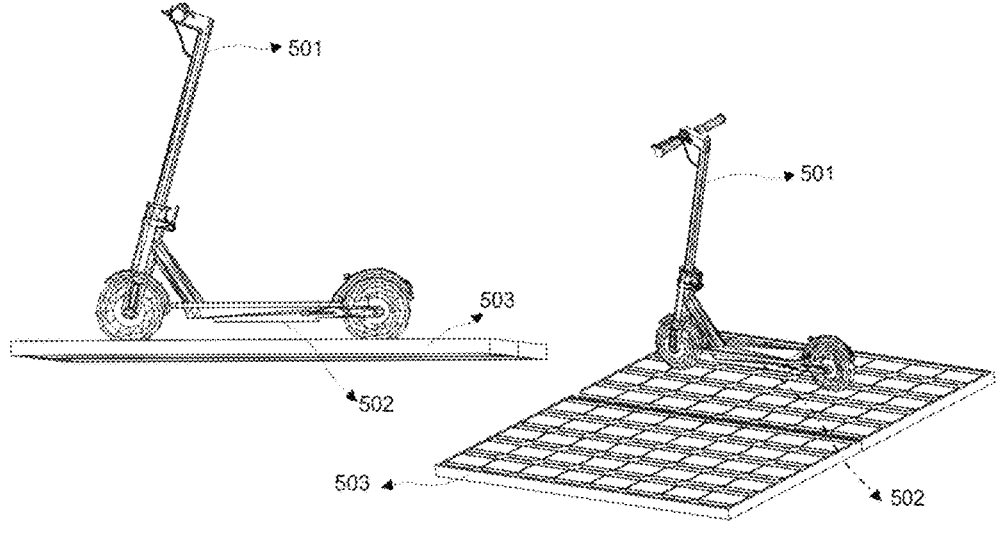
FIG. 5 illustrates an embodiment of the device as an electric scooter charging system.
Figure 6:
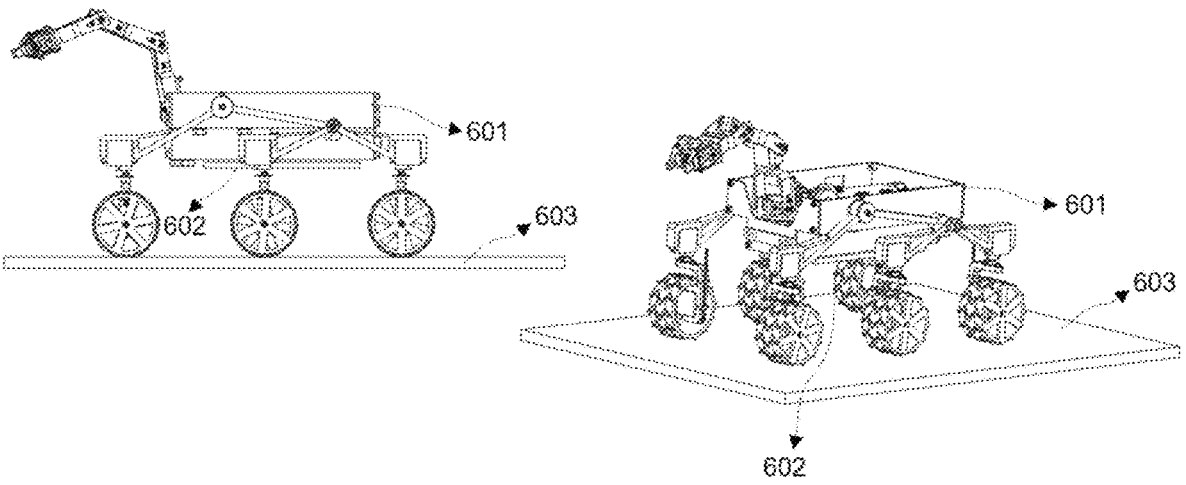
FIG. 6 illustrates an embodiment of the device as a space rover vehicle charging system.

In a preferred embodiment, these wireless receiver units are also planar flat devices and can be located in any device that needs to recharge its batteries, see FIGS. 4, 5 and 6. Some embodiments include wireless receiving units (402) in the legs of a drone (401) landed on the active surface (403). Other embodiments can have a wireless receiver placed in the bottom (502) of an electric vehicle (501) that has parked above an active surface (503), or located in the bottom (602) of a space vehicle (601) or any other robots or appliances with battery recharging demand. In another embodiment of the patent, the active surfaces can be located on tables, desks or public spaces and be used to recharge one or several mobile phones, laptops, pads or other electronic appliances simultaneously.

In some embodiments, the position of the active surface is not horizontal, it can be in a vertical, an inclined or any plane position as long as the recharging vehicle or robot can place its wireless receiver device relatively parallel and relatively close to the active surface. By relative parallel, angles with less than 40 degrees between the wireless receiver and the active surface planes are considered. By relatively close, separations below 50 centimeters between the receiver unit and the active surface, are considered. Increasing separations or relative angles between the wireless receiver and the active surface reduces the wireless energy transmission power rates and efficiency.

In some embodiments, electric vehicles or robots can recharge their batteries while in motion passing above or near the active surface without the need to stop on it. The fast speed of the optical control loop allows the dynamic recharging of moving devices. An example of methods and systems with a fast optical control loop using dedicated photodiodes to allow dynamic recharging is disclosed in U.S. Pat. Nos. 10,023,057 and 11,186,187, both of which are incorporated herein by reference.

Figure 7:
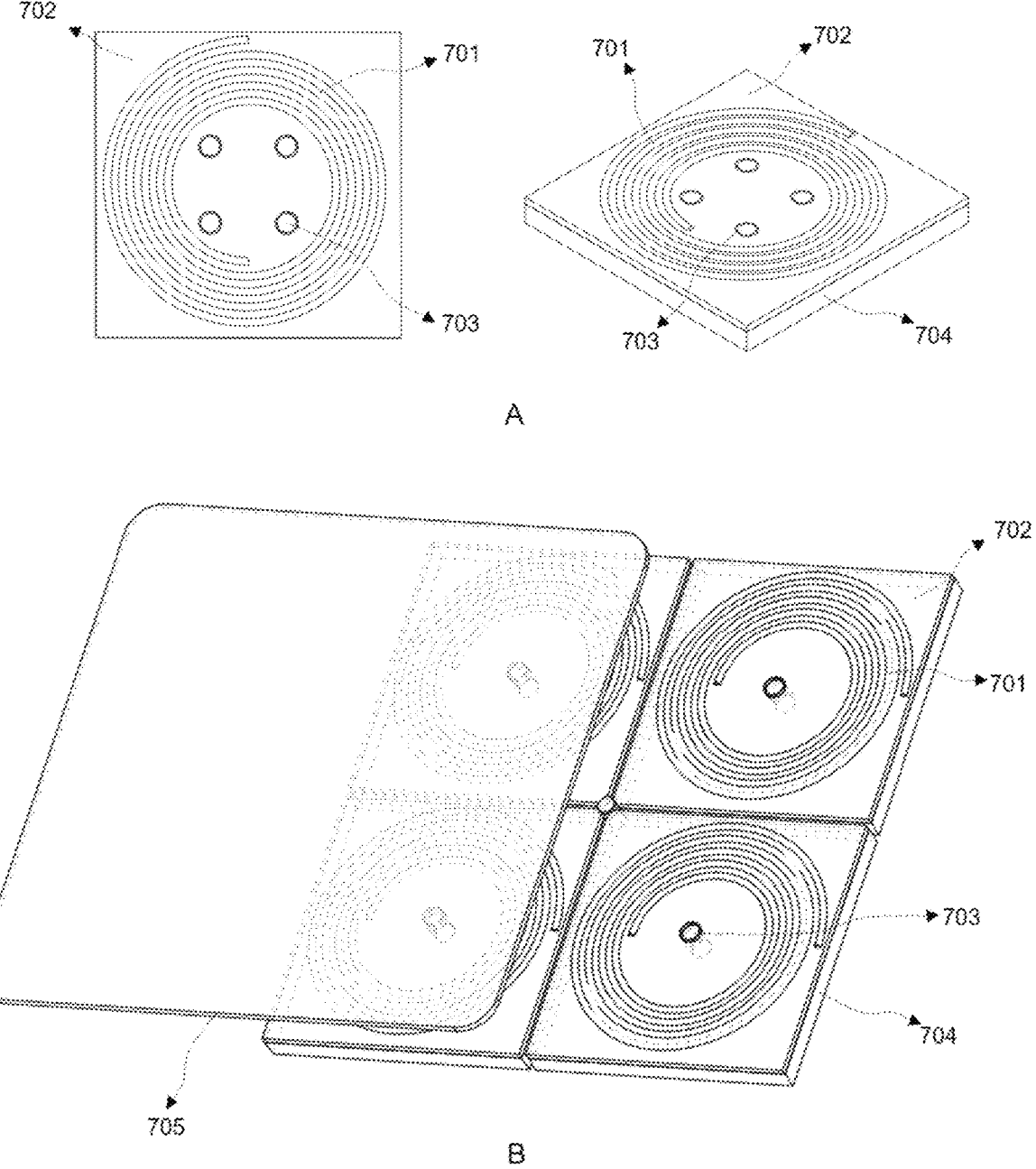
FIG. 7 illustrates the wireless receiver device and two embodiments with single and multiple element configurations.

FIG. 7A illustrates the energy receiver device formed by a conductive coil (701) with its respective soft ferrite tile (702) used for magnetic concentration and amplification, the light emission elements (703) (infrared high emission diodes or laser diodes in an embodiment of the invention) and the electronics (704) for the control of the optical pulses and power rectification of current delivered to batteries.

Figure 8:
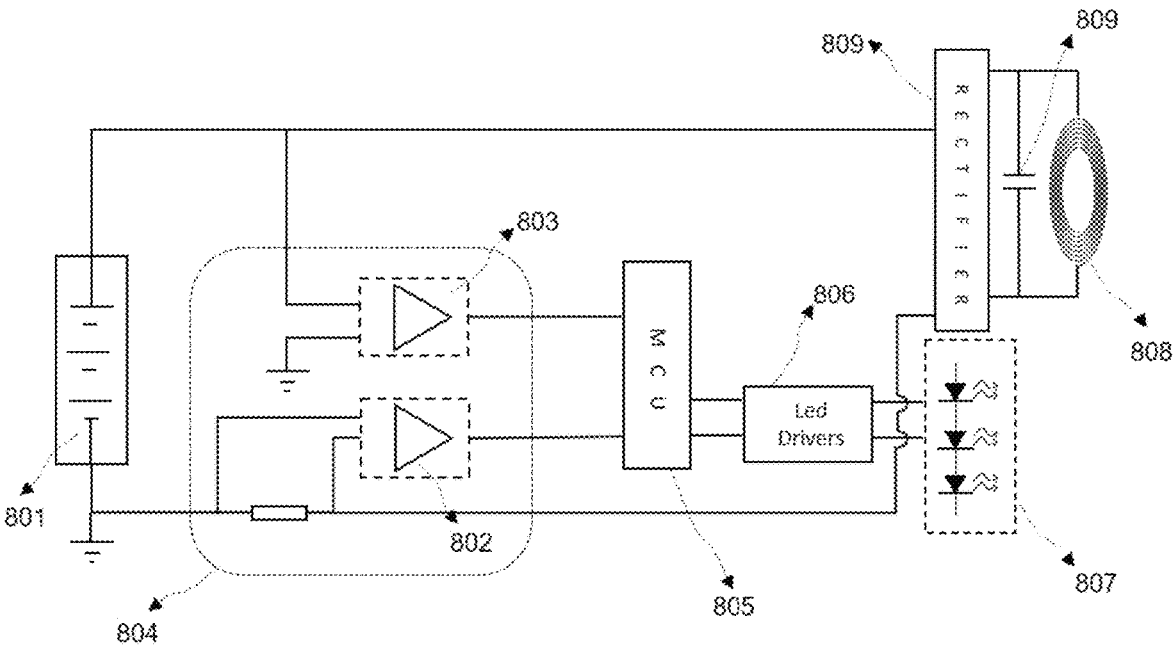
FIG. 8 illustrates the electronic system functionality of wireless receiving unit.

The electronic system functionality of a wireless receiving unit (704) is represented in FIG. 8. Depending on the application complexity and criticality, a Battery Management System (BMS) (804) or a simpler circuit comprising battery voltage and current measuring units (802, 803) estimate the state of the battery and the general status of the charging system by means of a microcontroller unit (MCU) (805). The MCU (801) then, based on the overall current readings as well as battery and systems status, turns on and off the photoemitter through the driver circuit (806) emitting optical pulses, for example at a pre-established frequency such as 20 kHz to 1 MHz, modulating the width of the pulse (pulse width modulation or PWM). The active cell circuits (described below) of the surface, located at the coverage area of the pulsed light, react to this optical signal generating oscillations in their coil-capacitor internal circuits. The wireless receiver coil-capacitor circuit (808, 809) interacts magnetically with the coil-capacitor circuits of the active cells of the active surface (1008) forming a coupled resonant circuit, allowing the transfer of energy from the surface to the receiver. This oscillating current produced in the coil-capacitor arrange of the wireless receiver is transformed into direct current in a semiconductor rectifier circuit (809) and sent to the battery, allowing its recharging process.

Figure 9:
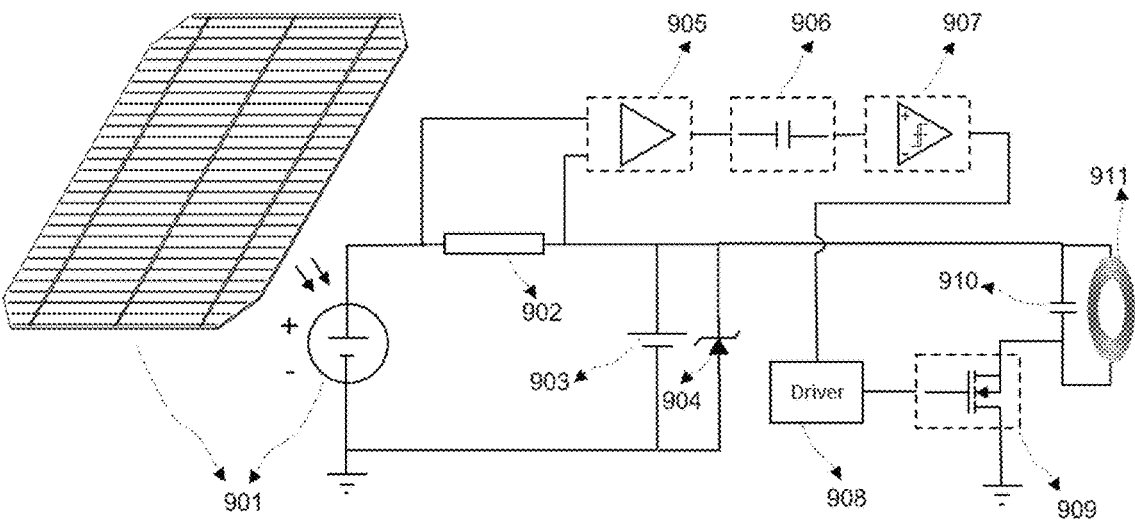
FIG. 9 illustrates the active cell circuit configuration for a non-external battery configuration.
Figure 10:
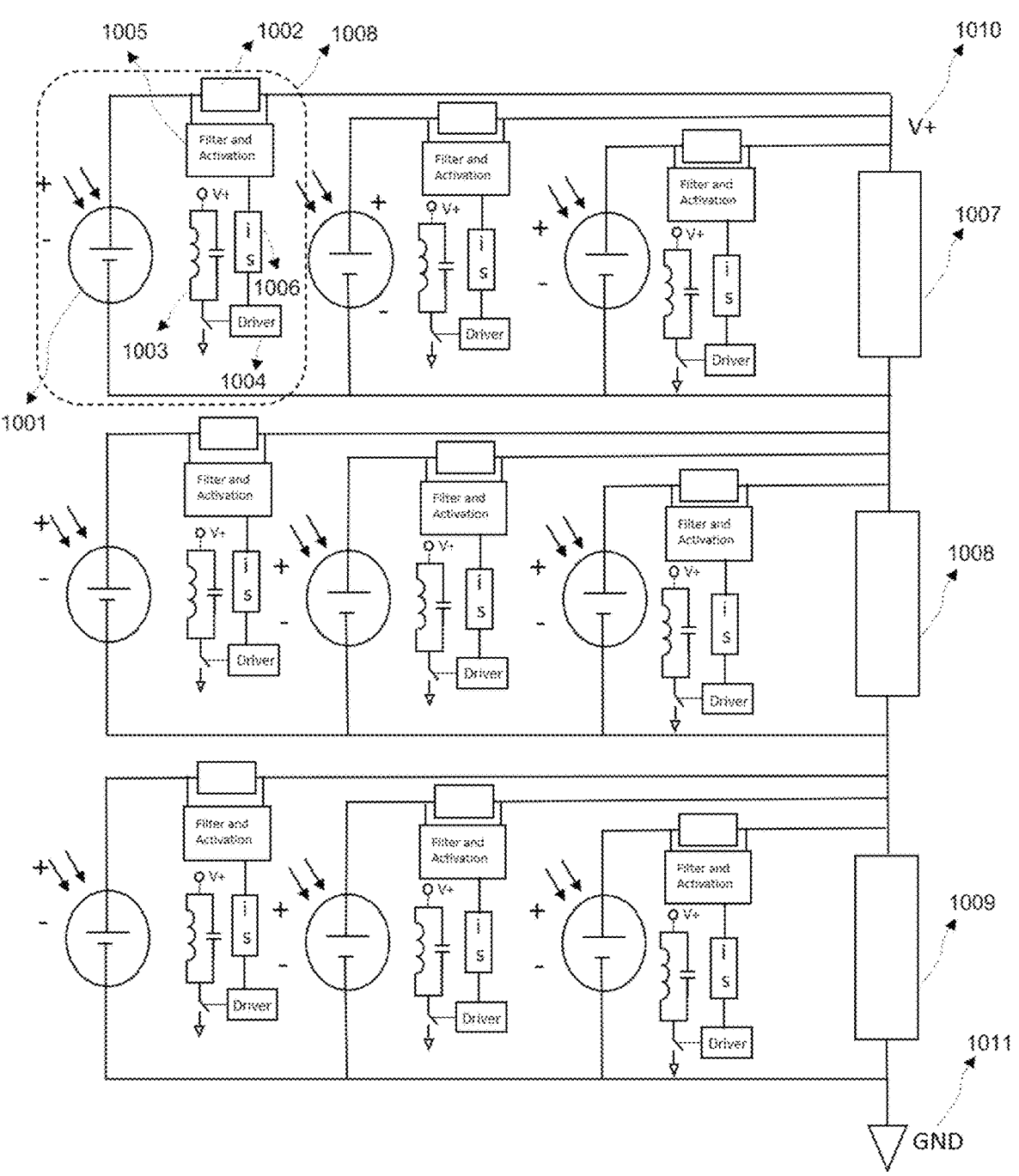
FIG. 10 illustrates the active cell circuit configuration for an external battery configuration.

The active surface circuit in embodiments of the invention is depicted in FIGS. 9 and 10. In FIG. 9, the active cells are independent of other active cells, each one functioning independently and isolated of other active cells. Each one of the elements reacts to the optical pulses it receives from the application wireless receiver by means of its own circuits and energy accumulation mechanisms. Each photovoltaic solar cell of the surface (901) serves two specific purposes, delivering energy to the local battery cell or capacitor, and detecting light pulses, acting simultaneously as both, an energy collecting device and an optical sensor. Light sources with very low variation frequencies (<1 Hz), like solar or ambient light, and high frequency light sources, like light pulses signals (10 kHz to 1 MHz), arrive overlapped to the solar photovoltaic cell. After being converted to electrical form, the resulting current passes through a shunt resistor (902) where is transformed to a voltage signal, and is amplified (905) and filtered (906). The filter blocks the continuous signal and let the high frequency signal pass, allowing to differentiate the high frequency signal pulses from the direct charging current caused by the sun/light environment. After filtering, a level comparator and analog circuit conditions the signal to feed the driver (908) responsible of activating the switching circuit (909) to stimulate the resonant coil-capacitor circuit (910, 911) of each active cell.

In alternative embodiments, each active cell shares its local power accumulation device, capacitor or battery cell, with others through an electric parallel connection. Active cells shadowed by any device recharging above it can, using this configuration, be energized by others with direct illumination.

In another embodiment, an electronic circuit located in each active cell compares the local capacitor or battery cell energy level with its neighbor's, allowing a current circulation from the most highly charged to those with a lower state of charge, producing a cascade effect, with net energy transmission from active cells with higher illumination or more energy accumulation to the lowest illuminated with lower state of charge parts though all the surface.

FIG. 10 illustrates a configuration in which there is an external battery pack shared by multiple active cells. Each solar photovoltaic cell (1001) belonging to a particular active cell (1008) is connected directly to a battery cell (1007, 1008, 1009) through a shunt resistor (1002) collaborating in the overall battery recharging process. Each active cell has its own independent signal amplification, filtering and conditioning module (1005) that reads the shunt (1002)

current signal. Coil-capacitor resonant circuits of each active cell (1003) share their main power source. They are connected in parallel to the main battery power terminals, V+ (1010) and GND (1011). As the ground reference of each resonant circuit differs from the active cell local ground, the driver and switching circuits (1004) must be decoupled taking into consideration the different voltage levels of each domain, using for this task an optical or analog isolator (1006).

Figure 11:
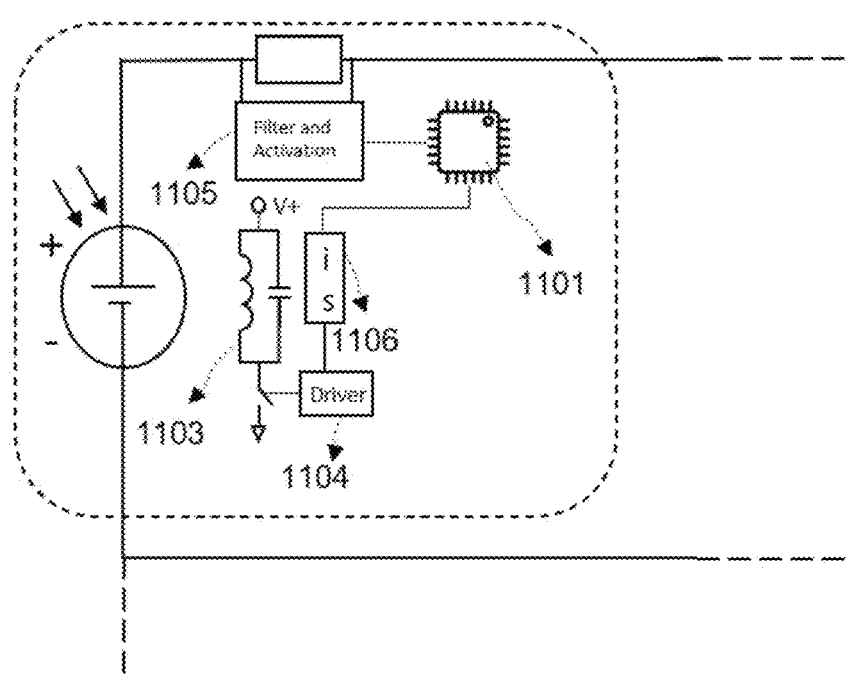
FIG. 11 illustrates an embodiment of the active cell circuit configuration with embedded digital communication functionality.

In the embodiment illustrated in FIG. 11, a unidirectional optical communication link is established between the energy receiver device and the active surface for authentication, system status, battery state or other data exchange purposes. The information transmission can take place in a pre-charging step before activation of the switching circuit, or can take place simultaneous with the charging operation. In some embodiments, information transmission during charging is achieved through the frequency modulation and codification of the optical pulsed signal by means of a microcontroller in the emitter part (MCU (805)), and a demodulator and decoder in the receiver part, (MCU (1101)). For example, modulating the optical pulses with small relative frequency shifts (for example ±2% of the base band of 50 kHz or ±1000 Hz) would have a negligible effect on the power control loop mechanism and allows a low data rate transmission of information useful for these purposes. Alternatively, the optical pulsed signals could have a high frequency component for data transfer superimposed on a low frequency component for activation of the power control loop. The demodulation stage is achieved using high pass analog filters (1105) or digital filtering using the MCU (1101). Transmission of information in a pre-charging step, before the switching circuit is activated, would not necessarily require demodulation and therefore direct transmission of data without the low frequency power control signal could take place using a variety of methods.

In other embodiments, bidirectional communication between the active surface and the energy receiver is established using external low power wireless communication devices using Wi-Fi, Bluetooth, NFC or other low power, near field wireless communication protocols. Such bidirectional communication could be useful for the purpose of authentication, system status, battery state or other data exchange purposes. In some embodiments, the infrared optical emission of solar cells when acting in reverse operation and powered by an external voltage source, is used to emit light pulses to the energy receiver and establish a bidirectional communication link between the active surface and the energy receiver.

In some embodiments, each active element of the surface can be in a locked state to prevent the use of the system unless several conditions are met. Prior to the activation of the surface by a battery recharging device, the robot, vehicle or other energy requester application can be required to send specific information using the optical pulses as binary coded information to unlock the system and start controlling the energy transfer. To allow this functionality, the MCU (805) present in the wireless receiver encodes the binary information to be sent and, similarly, a MCU (1101) present in each active cell decodes the information. After information is decoded and processed, if several conditions are verified, for example, receiver identification, receiver type, or other transactional and/or informative data, the microcontroller (1101) activates the switching and resonant circuit (1103) through the power driver (1104) allowing its normal energy flow operation. A variety of mechanisms are possible to authorize the wireless receiver to the charging system. In some embodiments a shared secret key is transmitted from the wireless receiver to the active cell to enable charging. The secret key can be protected during transmission using a time-based one type pad (TOTP) mechanism, such as that described in Internet Standard RFC 6238. Alternatively, a secret key could be protected using public key encryption by encoding it with a public key for the charging system. In other embodiments an authorization process can involve the wireless receiver sending credentials to the charging system whereby the charging system consults a remote database of authorized users. Such a remote database can also be used for billing purposes. Various combinations of the above methods are also possible.

The structural architecture of active cells with shared energy accumulation depicted in FIG. 10 makes possible the scalability of the system to larger surfaces, higher voltages and larger energy storage capacities. The example shown in FIG. 10 illustrates a three-by-three array of active cells storing and using energy from a battery composed of three cells in series. The defined structure allows the scalability of the system to very large numbers of active cell elements arranged in series and parallel and connected to very large banks of batteries for different applications.

In some embodiments, active surfaces are only partially populated with active cells with wireless transmission capabilities, leaving other areas comprised only by energy collecting regular solar cells. These areas with regular solar cells and no energy transmission functionality can have energy accumulation devices, like capacitors or batteries, shared with the active cell zones for its energy supply. In embodiments such as this, the wireless receiver would position itself in proximity to the active cells based on predetermined information or active detection of charging capabilities.

For some embodiments, the size and quantity of the wireless receiver elements can also be expanded as illustrated in FIG. 7B. The number and distribution of the light emitting devices must be in coherence with the size, number and distribution of active cells on the surface.

Figure 12:
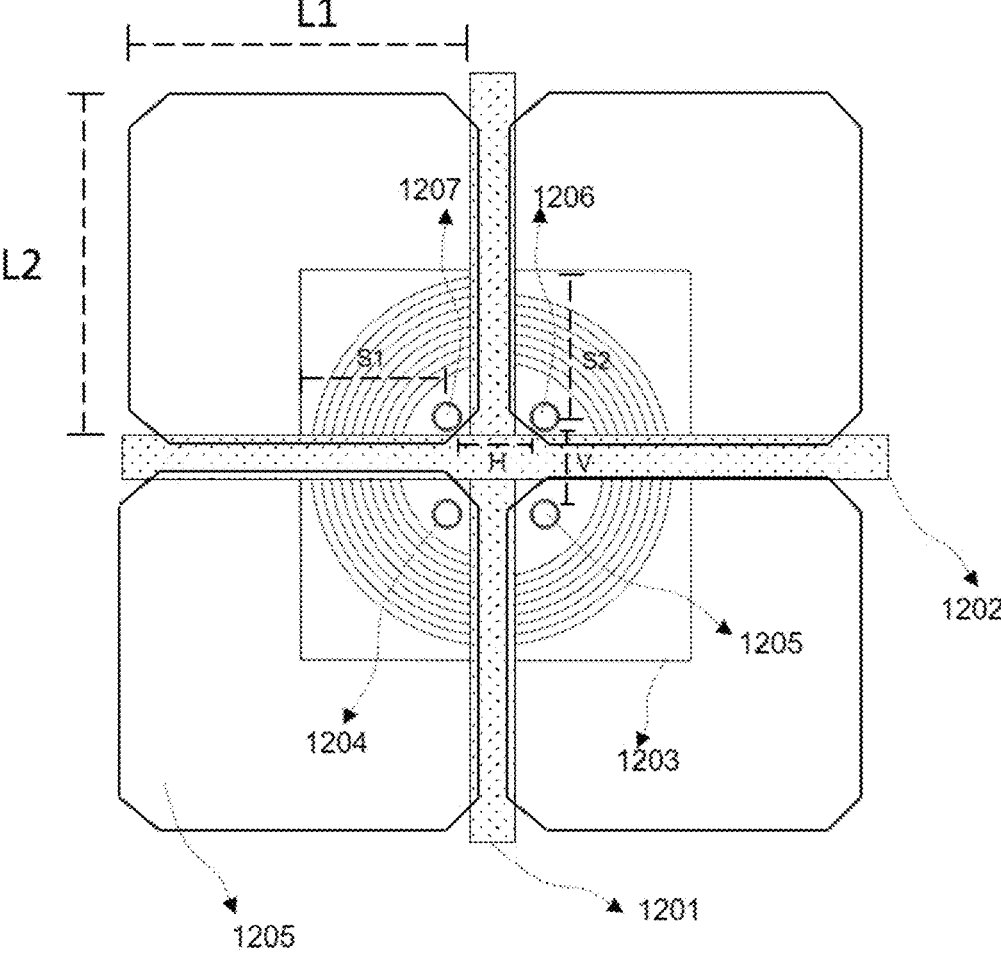
FIG. 12 illustrates an embodiment of the wireless receiver with a led array distribution to avoid non active zones of solar cells and maximize magnetic coupling.

The horizontal distribution of LEDs is preferably arranged to have enough space between them (H) to allow that, even if some of these LEDs happen to be positioned on the intersection of two solar cells without photoreception material (dead zone) (1201), the adjacent LEDs would fall in an active zone. For example, in FIG. 12, if LEDs (1204) and (1207) fall in the dead zone (1201) of the intersection of the solar cells, enough horizontal distance (H) to the adjacent column of LEDs (1205) and (1206) guarantees that this last group of LEDs will fall in an active solar cell zone. Analogously, the vertical distribution of LEDs preferably has enough space between them (V) to allow that, even if some of them happen to be positioned on the intersection of two solar cells without photoreception material (dead zone) (1202), the adjacent LEDs would fall in an active zone. For example, in FIG. 12, if LEDs (1204) and (1205) fall in the dead zone (1202) of the intersection of the solar cells, enough horizontal distance (V) to the adjacent row of LEDs (1207) and (1206) guarantee that this last group of LEDs will fall in an active solar cell zone.

A factor to consider in embodiments of the invention is the magnetic area of coverage. If a light pulse from a wireless receiver element stimulates an active element on the surface but there is not enough area of coil and ferrite material in its vicinity, the energy transfer of that cell could be inefficient and could produce overheating of its components. For this reason, some embodiments guarantee at least a 50% surface coverage of the active cell element. The horizontal distance (S1) between light emission devices (1204, 1205, 1206, 1207) and their closest vertical tile border (1203) would preferably have a dimension of at least L1/2, this is, half the horizontal dimension of the active cell. Analogously, the vertical distance (S2) between the LEDs (1204, 1205, 1206, 1207) and their closest horizontal tile border (1203) would preferably have a dimension of at least L2/2, that is, half the vertical dimension of the solar cell.

Figure 13:
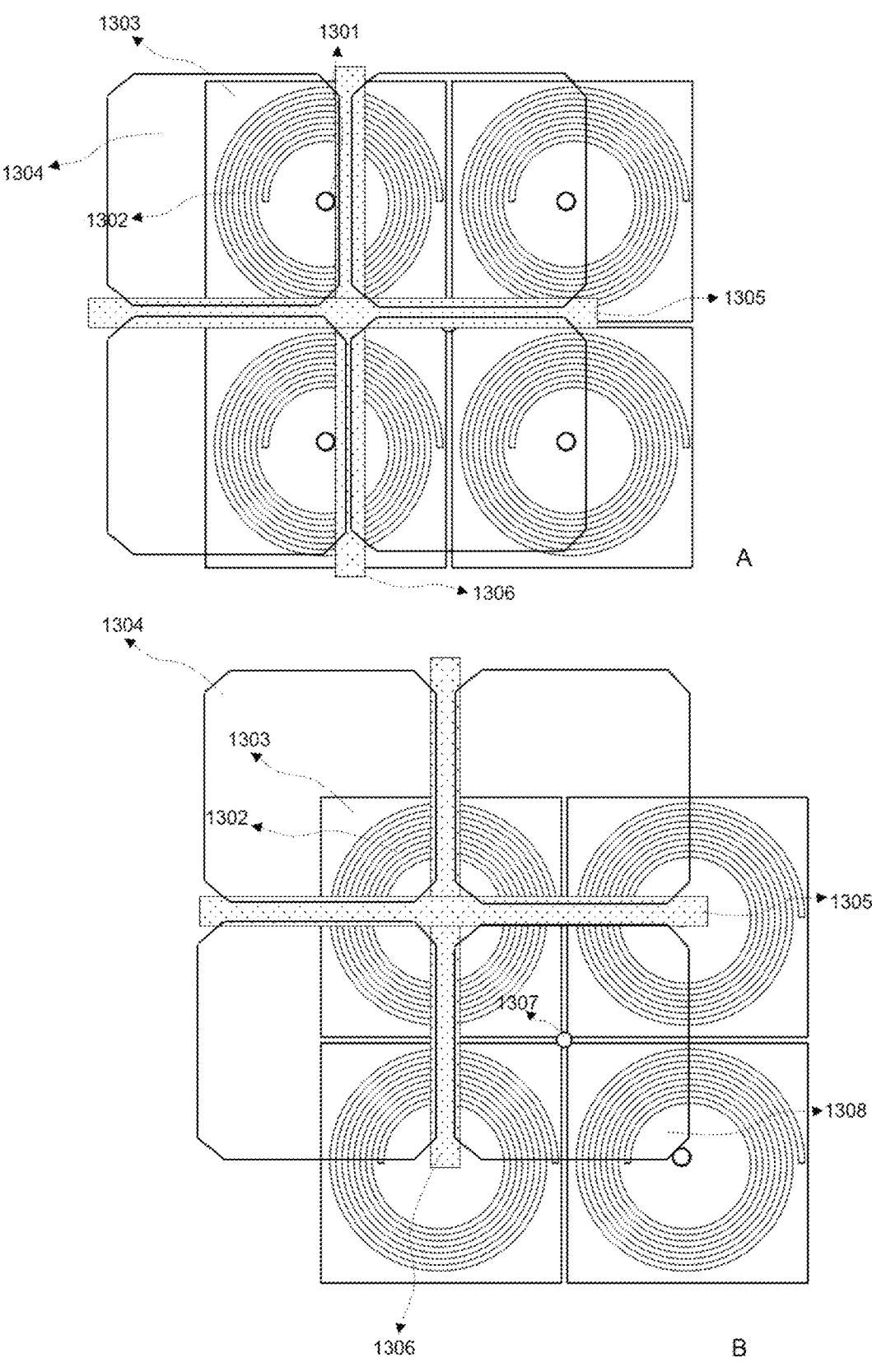
FIG. 13 illustrates an embodiment of the wireless receiver as a matrix of elements and led array distribution to avoid dead zone occlusion and maximize energy coupling.

Most of the considerations applied to the relationship of preferred LED distribution and size between the wireless receiver elements and active cell elements on the surface for multiple receiver elements are analogous to the single receiver element case. Some special border conditions are considered and depicted in FIG. 13A and FIG. 13B. In FIG. 13A, the special case of the limit activation is showed, with a LED column (1301) near to the border of the dead zone (1306) verifying that, considering the restrictions applied to the single receiver case, enough reception surface of ferrite material (1303) and coil (1302) is attained. FIG. 13B, illustrates a special case, also in a border condition, with most of LEDs occluded by non-operative dead zones (1305, 1306). Even in that special case, the operation would be acceptable, as the central LED of the wireless receiver element arrangement (1307) would illuminate the center of the bottom right solar cell of the active cell element (1308) having almost all of its surface covered by ferrite material and reception coils.

In a preferred embodiment, the receiver elements are protected by a glass or plastic cover (705), FIG. 7B, which also has the function of light diffusor. This protective element can also serve as a light filter, for example using a smoked glass or adding a filter film.

The invention claimed is:

1. A wireless charging apparatus comprising:
a plurality of photovoltaic cells adapted to collect energy;
a plurality of energy transmitting devices; and
a control circuit coupled to said photovoltaic cells and controlling said energy transmitting devices;
wherein said control circuit comprises an optical receiving circuit configured to receive an activation signal from one or more of said photovoltaic cells to locate an external energy receiving device; and
wherein said control circuit is configured to activate one or more of said energy transmitting devices based on said activation signal.

2. The wireless charging apparatus of claim 1:
wherein said photovoltaic cells and said energy transmitting devices are oriented along a planar surface; and
wherein said control circuit is configured to activate one or more of said energy transmitting devices in a predetermined physical relationship with said one or more of said photovoltaic cells receiving said activation signal.

3. The wireless charging apparatus of claim 2 wherein said energy transmitting devices are located behind said photovoltaic cells.

4. The wireless charging apparatus of claim 2 wherein said energy transmitting devices are located in front of said photovoltaic cells.

5. The wireless charging apparatus of claim 2 wherein said energy transmitting devices are embedded in between said photovoltaic cells.

6. The wireless charging apparatus of claim 1:
wherein said photovoltaic cells are oriented along a first planar surface and said energy transmitting devices are oriented along a second planar surface; and wherein said control circuit is configured to activate one or more of said energy transmitting devices in a predetermined physical relationship with said one or of said photovoltaic cells receiving said activation signal.

7. The wireless charging apparatus of claim 1 configured to transmit energy to a vehicle comprising said external energy receiving device located in proximity to one or more of said energy transmitting devices, wherein said vehicle is configured to transmit said activation signal to one or more of said photovoltaic cells.

8. The wireless charging apparatus of claim 7 configured to transmit energy to a moving vehicle such that said control circuit is configured to dynamically receive said activation signal from a different one or more of said photovoltaic cells and activate a different one or more of said energy transmitting devices at different times.

9. The wireless charging apparatus of claim 1 further comprising:

an energy storage device coupled to and receiving energy from one or more of said plurality of said photovoltaic cells;

wherein said energy transmitting devices are coupled to and receive energy from said energy storage device.

10. The wireless charging apparatus of claim 1 wherein said activation signal comprises optical pulses and said control circuit is configured to control a frequency that said one or more of said energy transmitting devices is energized based on said optical pulses.

11. A method of wirelessly charging an external device comprising the steps of:

receiving an activation signal from one or more of a plurality of photovoltaic cells adapted to collect energy, wherein said activation signal locates an external energy receiving device;

activating one or more energy transmitting devices based on said activation signal, wherein said one or more energy transmitting devices are selected among a plurality of energy transmitting devices based on said activation signal.

12. The method of claim 11:

wherein said photovoltaic cells and said energy transmitting devices are oriented along a planar surface; and wherein said one or more of said energy transmitting devices are in a predetermined physical relationship with said one or more of said photovoltaic cells receiving said activation signal.

13. The method of claim 12 wherein said energy transmitting devices are located behind said photovoltaic cells.

14. The method of claim 12 wherein said energy transmitting devices are located in front of said photovoltaic cells.

15. The method of claim 12 wherein said energy transmitting devices are embedded in between said photovoltaic cells.

16. The method of claim 11:

wherein said photovoltaic cells are oriented along a first planar surface and said energy transmitting devices are oriented along a second planar surface; and wherein said one or more of said energy transmitting devices are in a predetermined physical relationship with said one or of said photovoltaic cells receiving said activation signal.

17. The method of claim 11 wherein energy is transmitted to a vehicle comprising said external energy receiving device located in proximity to one or more of said energy transmitting devices, and wherein said vehicle transmits said activation signal to one or more of said photovoltaic cells.

18. The method of claim 17 wherein energy is transmitted to a moving vehicle further comprising the steps of:

receiving an activation signal from a different one or more of said plurality of photovoltaic cells based on a new location of said vehicle; and activating a different one or more energy transmitting devices based on said activation signal.

19. The method of claim 11 further comprising:

delivering energy to an energy storage device coupled to one or more of said plurality of said photovoltaic cells;

wherein said energy transmitting devices are coupled to and receive energy from said energy storage device.

20. The method of claim 11 wherein said activation signal comprises optical pulses and said step of activating operates said one or more of said energy transmitting devices at a frequency based on said optical pulses.

\* \* \* \* \*